No. 665,291. Patented Jan. 1, 1901.
I. G. WHEATLEY.
HULLING AND SEPARATING BEANS, &c.
(Application filed Sept. 19, 1898.)
(No Model.) 3 Sheets—Sheet 1.
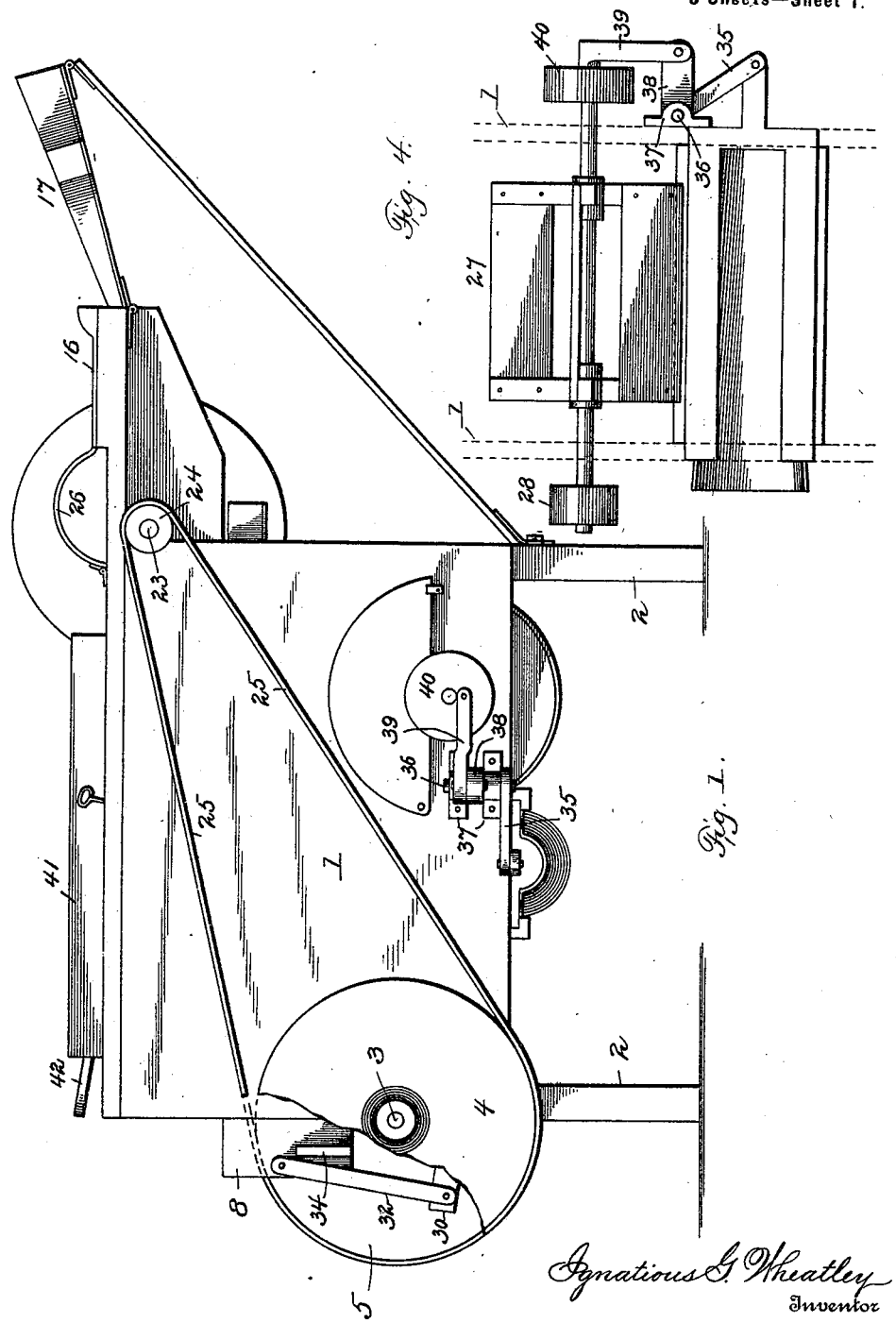
Witnesses
John Enders Jr.
Guy Coombs
Ignatious G. Wheatley
Inventor
By L. Deane & Son
his Attorneys

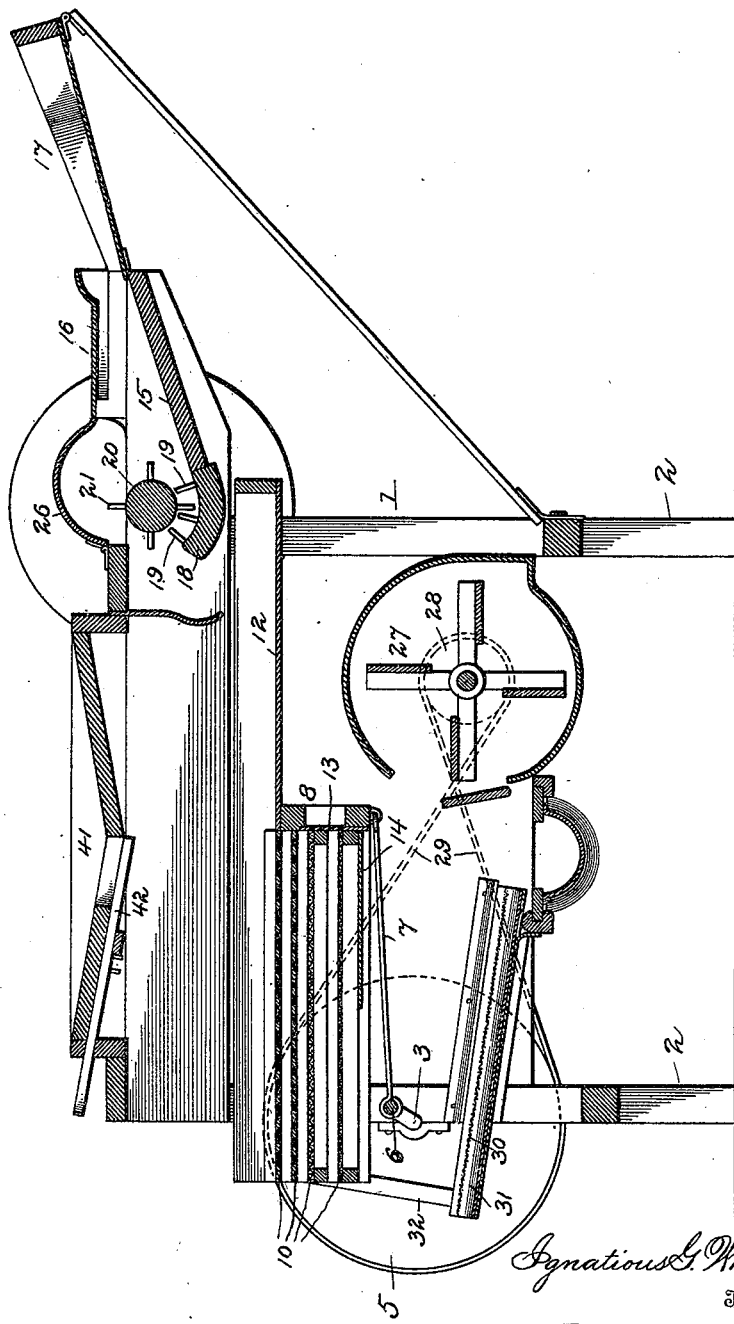

No. 665,291. Patented Jan. 1, 1901.
I. G. WHEATLEY.
HULLING AND SEPARATING BEANS, &c.
(Application filed Sept. 19, 1898.)
(No Model.) 3 Sheets—Sheet 3.
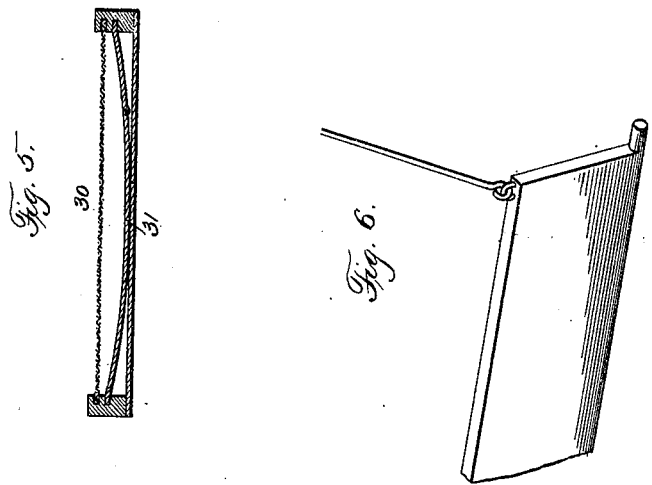
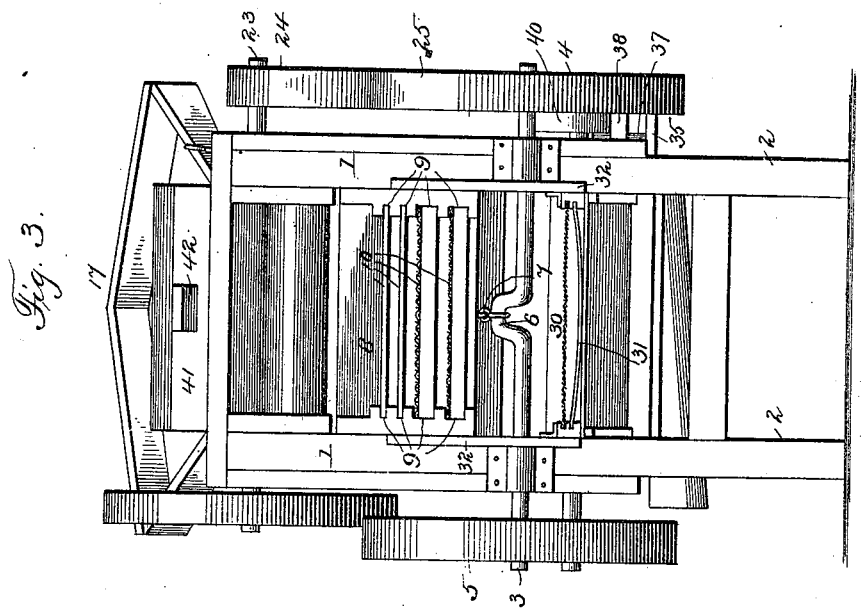

UNITED STATES PATENT OFFICE.

IGNATIOUS GABREL WHEATLEY, OF SPRINGFIELD, MISSOURI.

HULLING AND SEPARATING BEANS, &c.

SPECIFICATION forming part of Letters Patent No. 665,291, dated January 1, 1901.

Application filed September 19, 1898. Serial No. 691,349. (No model.)

*To all whom it may concern:*

Be it known that I, IGNATIOUS GABREL WHEATLEY, a citizen of the United States, residing at Springfield, in the county of Greene and State of Missouri, have invented certain new and useful Improvements in Hulling and Separating Beans, Wheat, and other Small Grain; and I do hereby declare the following to be a full, clear, and exact description of the invention, such as will enable others skilled in the art to which it appertains to make and use the same.

My invention relates to machines for hulling and separating beans, wheat, and other small grain; and its object is to provide an improved construction of the same which shall possess superior advantages with respect to efficiency in operation.

The invention consists in the novel construction and combination of parts hereinafter fully described and claimed.

In the accompanying drawings, Figure 1 is a side elevation of a bean huller, separator, and cleaner constructed in accordance with my invention. Fig. 2 is a longitudinal sectional view. Fig. 3 is a rear view. Figs. 4, 5, and 6 are detail views.

In the said drawings the reference-numeral 1 designates a casing supported upon legs 2. Journaled in the sides or walls of this casing is a transverse shaft 3, having a pulley 4 and 5 at each end and provided with a central crank 6, connected by means of a crank 7 with a horizontally-reciprocating shaker-frame 8. The inner sides of this frame are provided with longitudinal grooves 9, in which are located a number of screens 10 of varying sizes of mesh. The front end of this shaker-frame is provided with an imperforate plate 12, provided at the rear end with a vertical plate 13 of perforated metal, through which the blast from a fan passes, and with an imperforate longitudinal plate 14.

At the upper front end of the casing 1 is a feeding-table 15, provided with a cover 16, and located in front of said table and pivotally connected with said casing is a hopper 17. In front of the feed-table is a plate 18, provided with a number of pins 19, and above this plate is a rotatable roller 20, provided with teeth 21. The shaft 23 of this roller is provided with a pulley 24, connected by a belt 25 with the pulley 4, by which it is rotated. The numeral 26 designates a concave cover for said roller. Located beneath said roller is a fan-blower 27, driven by a small pulley 28, connected by a belt 29 with pulley 5.

Located at the rear end of the casing 1 is a vibrating shaker 30 of wire gauze, having a bottom 31, consisting of curved imperforate plate with a space therebetween. This plate is connected with the shaker-frame by hangers 32, pivoted thereto, which hangers are adapted to be struck by lugs 34, secured to the shaker-frame.

Located in front of the vibrating screen is a vibrating trough to receive the shelled and cleaned beans. This trough works in guides in the lower part of the casing 1 and at one end is connected with a crank 35, secured to a stud-shaft 36, journaled in lugs 37 on one of the sides of the casing 1. The upper end of this shaft is also provided with a crank 38, which is connected with a pitman 39, pivoted to a crank-wheel 40, secured to one end of the shaft of the fan.

The upper end of the casing 1 is provided with a rectangular opening in which is seated a cover 41, the ends of which incline toward the center and one of which is formed with an opening which is closed by a slide 42. The object of this construction is to subject the shelled beans to the action of the fan-blast should the chaff and dirt be not thoroughly removed.

The numeral 43 designates a pivoted board located in front of the fan and is connected with a handle 45, by operating which the board can be adjusted to regulate the blast of the fan.

The operation is as follows: The pods are fed from the hopper to the feed-table and are then caught between the toothed roller and plate, and the beans are hulled. The hulls and beans will now fall onto the top screens of the shaking tables and will fall through the meshes thereof onto the wire-gauze screens and from thence to the vibrating trough. The hulls will be carried over the rear end of the machine and be deposited on the ground. While this operation is going on the shaker-frame and screens will be vibrated, causing the hulls to be ejected at the rear of the latter. At the same time the fan will be operated to blow out dust and dirt. Any beans which may be carried over the rear end of the machine with the hulls will fall onto the lower screen and be carried to the trough.

In addition to being a bean huller and separator the machine may be used as a fan for separating wheat and other small grain from chaff and dirt.

Having thus fully described my invention, what I claim is—

1. The combination with a casing and a reciprocatory shaker-frame, of lugs on said reciprocatory frame, a vibratory shaker at the rear end of the casing beneath the reciprocatory shaker-frame, and hangers pivotally connected to the frames of the said shakers and disposed in the path of said lugs to be engaged thereby as the reciprocatory frame is actuated, substantially as specified.

2. The combination with a casing, and a reciprocatory shaker-frame, of a vibratory shaker pivotally suspended from said frame, lugs on said frame adapted to move in the path of the suspending means of said shaker, means located between the shaker-frame and shaker for reciprocating the former, and a vibratory trough arranged in front of said shaker and mounted for movement at right angles to the reciprocation of the shaker-frame, all substantially as shown and described.

In testimony whereof I affix my signature in presence of two witnesses.

IGNATIOUS GABREL WHEATLEY.

Witnesses:
   A. F. DIGGS,
   W. E. WHEATLEY.